United States Patent
Booton

(10) Patent No.: US 7,177,405 B2
(45) Date of Patent: Feb. 13, 2007

(54) COMPUTER TELEPHONY INTEGRATION INCLUDING OPTION FOR CALLING PARTY TO RE-DIRECT UNANSWERED CALL FROM VOICE MESSAGING TO SECOND LOWER INTEREST USERS ASSOCIATED WITH CALLED PARTY

(75) Inventor: Laurence J Booton, Woodbridge (GB)

(73) Assignee: British Telecommunications public limited company, London (GB)

( * ) Notice: Subject to any disclaimer, the term of this patent is extended or adjusted under 35 U.S.C. 154(b) by 606 days.

(21) Appl. No.: 10/469,352

(22) PCT Filed: Mar. 18, 2002

(86) PCT No.: PCT/GB02/01287

§ 371 (c)(1),
(2), (4) Date: Aug. 28, 2003

(87) PCT Pub. No.: WO02/078310

PCT Pub. Date: Oct. 3, 2002

(65) Prior Publication Data

US 2004/0071273 A1  Apr. 15, 2004

(30) Foreign Application Priority Data

Mar. 26, 2001 (EP) .................................. 01302781

(51) Int. Cl.
*H04M 3/42* (2006.01)
*H04M 3/533* (2006.01)

(52) U.S. Cl. .................. 379/88.18; 379/201.02; 379/201.04; 379/207.14; 379/207.15

(58) Field of Classification Search .. 379/88.18–88.27, 379/201.01, 201.02, 201.04, 201.07, 201.08, 379/201.09, 207.14, 207.15, 211.01, 211.02, 379/211.03, 212.01, 265.01–265.04
See application file for complete search history.

(56) References Cited

U.S. PATENT DOCUMENTS 5,056,086 A  10/1991  Libonati ...................... 370/259
7,103,164 B1 *  9/2006  Booton ................... 379/201.02

FOREIGN PATENT DOCUMENTS

| WO | WO 92/22164 | 12/1992 |
| WO | WO 97/24007 | 7/1997 |
| WO | WO 98/48557 | 10/1998 |
| WO | WO 00/59190 | 10/2000 |

OTHER PUBLICATIONS

Cronin, "An Introduction to TSAPI and Network Telephony", IEEE Communications Magazine, Apr. 1996, pp. 48-54.
European Examination Report—Jun. 16, 2004.

* cited by examiner

*Primary Examiner*—Harry S. Hong
(74) *Attorney, Agent, or Firm*—Nixon & Vanderhye, P.C.

(57) ABSTRACT

In a CTI system an incoming call is alerted to the called user's list of users who have expressed a primary level of interest in that called user's incoming calls, and the call is routed by the PBX to a Voicemail system if, for example the call is not answered within a predetermined time. The Voicemail system plays an announcement inviting the caller to key "one" to have the call re-presented, and if that digit is keyed by the caller, the Voicemail system makes a call to a predetermined extension of the PBX. The PBX recognizes, e.g. by using call ID or DNIS, that the call received on that extension is a re-presented call, and alerts the called user's list of users who have expressed a secondary level of interest, with or without alerting the "primary" list users. A tertiary list of users who have expressed a tertiary level of interest in that called user's incoming calls may be used in the event that the call is routed to the Voicemail system for a second time and the caller again keys "one".

12 Claims, 6 Drawing Sheets

| DNIS | USERNAME |
|:---:|:---:|
| A | X |
| B | Y |
| C | Z |
| D | X |
| E | Y |

COMPUTER TELEPHONY INTEGRATION INCLUDING OPTION FOR CALLING PARTY TO RE-DIRECT UNANSWERED CALL FROM VOICE MESSAGING TO SECOND LOWER INTEREST USERS ASSOCIATED WITH CALLED PARTY

This application is the US national phase of international application PCT/GB02/01287 filed 18 Mar. 2002 which designated the U.S.

BACKGROUND

1. Technical Field

This invention relates to the use of a computer for controlling the operation of a telephony system, such use is known in the art as computer telephony integration (CTI), and the systems employing such control are known as CTI systems.

2. Related Art

As a general background, the reader will find examples of such CTI systems disclosed in the articles "Introduction to Computer Telephony Integration", by A. Catchpole, G. Crook, and D. Chesterman, British Telecommunications Engineering, Vol. 14, July 1995; "Computer Telephony Integration—The Meridian Norstar", by A. Catchpole, British Telecommunications Engineering, Vol. 14, October 1995; "Computer Telephony Integration—The Meridian 1 PBX", by P. Johnson, A. Catchpole, and L. Booton, British Telecommunications Engineering, Vol. 15, July 1996; "Callscape—Computer Telephony Integration for the Small Business", by G. Hillson, G. Hardcastle, and M. Allington, British Telecommunications Engineering, Vol. 15, January 1997, and "Call Centres—Doing Business by Telephone" by M. Bonner, British Telecommunications Engineering, Vol. 13, July 1994.

Furthermore, a method is known of operating a CTI system comprising a CTI-enabled PBX, an associated CTI controller, and a plurality of user workstations, each workstation comprising a computer connected to the CTI controller and a telephone connected to the PBX In this method, the CTI controller stores respective user-associated profiles, each including a user-associated workgroup containing names of users of the system, in whose telephony status the user associated with that workgroup is interested, and the PBX on receipt of an incoming call retrieves from the signalling data a dialled number (known as the Dialled Number Identification Service number (DNIS)) and the calling line identity or identification (CLI), and passes these to the CTI controller. The CTI controller translates the DNIS to a username for the called user and accesses the workgroups to find out which contain that username. The CTI controller then sends a message containing that username to each computer at which a user, whose workgroup contains that username, is currently logged on to the CTI controller. It will be appreciated that in the art, the terms log on, logon, log in and login are synonymous and interchangeable, as are the terms log off, logoff, log out and logout.

While a user is currently logged on to the CTI controller, his computer displays a respective set of icons representing the members of that user's workgroup, the icons being in the form of respective facial images, each icon including a text display, e.g. "Free", to indicate the current telephony status of the corresponding user, and upon receipt of this message, the computers change the text display of the icon corresponding to the received user name to "Ringing". A user can answer an incoming call for a member of his workgroup by sending an answer message from his computer to the CTI controller, and the CTI controller responds by commanding the PBX to connect the incoming call to that user's telephone. This method is referred to as Distributed Office Telephony (DOT).

BRIEF SUMMARY

According to a first aspect of the present invention, there is provided a method of operating a computer telephony integration (CTI) system comprising a switch and a CTI controller therefor, voice messaging apparatus connected to the switch, and a plurality of user workstations, each workstation comprising a computer connected to the CTI controller and a telephone connected to the switch, the method comprising the steps of:- storing, for each user of the system, a respective first user-associated list of users who have assigned a first level of interest in the telephony status of that user, herein referred to as that user's first community of interest, and a respective second user-associated list of users who have assigned a second level of interest in the telephony status of that user, herein referred to as that user's second community of interest;

responding to receipt at the switch of an incoming call, referred to herein as an original incoming call, by retrieving from signalling data of that original incoming call a called user identity, referred to herein as the original called user identity, and by starting a countdown timer from a predetermined value;

sending an incoming call message from the CTI controller to the respective computers of those members of that original called user's first community of interest who are currently logged on to the CTI controller;

responding to receipt of the incoming call message at those respective computers by generating an alert;

in the event that the countdown timer reaches zero, routing that original incoming call to the voice messaging apparatus and sending a change icon message to those respective computers to change the respective generated alerts;

responding to receipt at the voice messaging apparatus of that routed original incoming call and of predetermined dialled data from the caller by making a related call from the voice messaging apparatus to a predetermined called user identity of the switch;

recognising that a call received at the switch is such a related call by virtue of the presence of that predetermined called user identity in the signalling data of that received call;

identifying the original incoming call to which that received call is so related, and, therefore, the original called user identity; and sending an incoming call message from the CTI controller to the respective computers of those members of that called user's secondary community of interest who are currently logged on to the CTI controller.

Preferably, when the incoming call message is sent to the respective computers of those members of that called user's secondary community of interest who are currently logged on to the CTI controller, it is also sent to the respective computers of those members of that called user's primary community of interest who are currently logged on to the CTI controller.

Preferably, when the step of generating an alert comprises changing a user-associated icon from an idle state to an incoming call state, the respective computers may respond to said change icon message to change the respective user-associated icons back to their idle state.

Alternatively, when the step of generating an alert comprises changing a user-associated icon from an idle state to an incoming call state, the respective computers may respond to said change icon message to indicate that the original incoming call has been routed to the voice messaging apparatus.

According to a second aspect of the present invention, there is provided a computer telephony integration (CTI) system comprising a switch and a CTI controller therefor, voice messaging apparatus connected to the switch, and a plurality of user workstations, each workstation comprising a computer connected to the CTI controller and a telephone connected to the switch, the system comprising:- means for storing, for each user of the system, a respective first user-associated list of users who have assigned a first level of interest in the telephony status of that user, herein referred to as that user's first community of interest, and a respective second user-associated list of users who have assigned a second level of interest in the telephony status of that user, herein referred to as that user's second community of interest;

means for responding to receipt at the switch of an incoming call, referred to herein as an original incoming call, by retrieving from signalling data of that original incoming call a called user identity, referred to herein as the original called user identity, and by starting a countdown timer from a predetermined value;

means for sending an incoming call message from the CTI controller to the respective computers of those members of that original called user's first community of interest who are currently logged on to the CTI controller;

means for responding to receipt of the incoming call message at those respective computers by generating an alert;

means responsive to the countdown timer reaching zero for routing that original incoming call to the voice messaging apparatus and for sending a change icon message to those respective computers to change the respective generated alerts;

means for responding to receipt at the voice messaging apparatus of that routed original incoming call and of predetermined dialled data from the caller by making a related call from the voice messaging apparatus to a predetermined called user identity of the switch;

means for recognising that a call received at the switch is such a related call by virtue of the presence of that predetermined called user identity in the signalling data of that received call;

means for identifying the original incoming call to which that received call is so related, and, therefore, the original called user identity; and means for sending an incoming call message from the CTI controller to the respective computers of those members of that called user's secondary community of interest who are currently logged on to the CTI controller.

Preferably, the CTI system is arranged such that when the incoming call message is sent to the respective computers of those members of that called user's secondary community of interest who are currently logged on to the CTI controller, it is also sent to the respective computers of those members of that called user's primary community of interest who are currently logged on to the CTI controller.

The CTI system may be arranged such that the generated alert comprises changing a user-associated icon from an idle state to an incoming call state, and such that the respective computers respond to the change icon message by changing the respective user associated icons back to their idle state.

Alternatively, the CTI system may be arranged such that the generated alert comprises changing a user-associated icon from an idle state to an incoming call state, and such that the respective computers to the change icon message by indicating that the original incoming call has been routed to the voice messaging apparatus.

BRIEF DESCRIPTION OF THE DRAWINGS

Preferred embodiments of apparatus and methods of the present invention will now be described by way of example with reference to the drawings, in which:-

FIG. 5 shows the structure of part of a number-to-name table used by the CTI server.

DETAILED DESCRIPTION OF EXEMPLARY EMBODIMENTS

In this description the following acronyms are used:-

Figure 1:
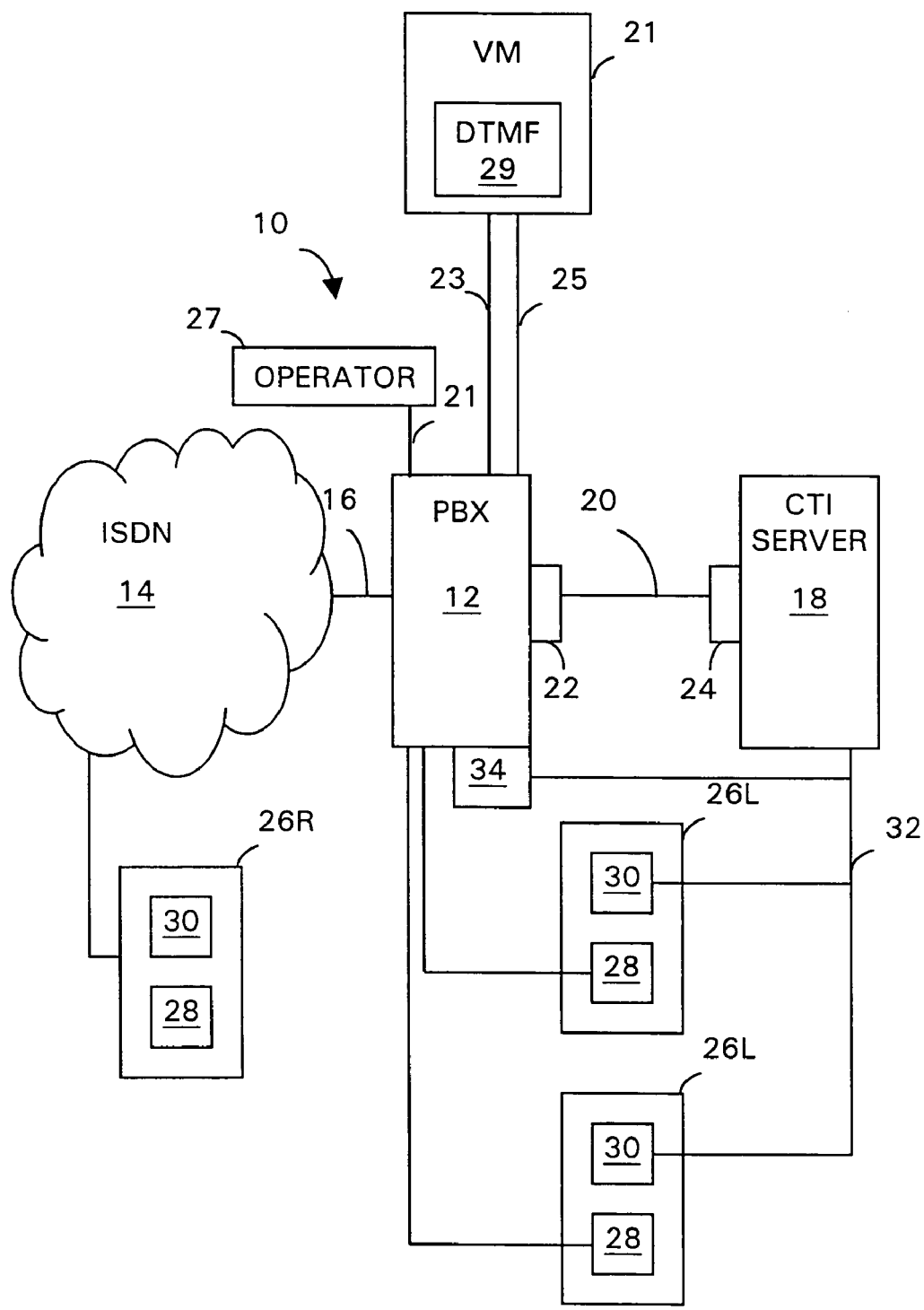
FIG. 1 is a block diagram of an apparatus of the present invention.

CLI—Calling Line Indication, also known as Calling Line Identity,

CSTA—Computer Supported Telecommunications Applications,

CTI—Computer Telephony Integration,

DNIS—Dialled Number Identification Service number,

DOT—Distributed Office Telephony,

ISDN—Integrated Services Digital Network,

LAN—Local Area Network,

PBX—Private Branch Exchange,

RAM—Random Access Memory,

ROM—Read Only Memory,

In FIG. 1 there is shown a CTI system 10, also referred to as a DOT system, comprising a CTI-enabled PBX 12, constituting a switch of the present invention, connected to an ISDN 14 via an ISDN primary rate link 16, a CTI server 18 connected to the PBX 12 via a data link 20, and a Voice Mail system 21 referred to as VM 21 connected via a first telephony link 23 to a port of the PBX 12 corresponding to extension number 6000 and via a second telephony link 25 to a port corresponding to extension number 6001, and an operator console 27 connected to a port of the PBX 12 corresponding to extension number 7777. The CTI server 18 constitutes a CTI controller of the present invention. Herein, the terms "Voice Mail" and "Voicemail" are used interchangeably and synonymously.

The PBX 12 has a CTI interface 22 which operates in accordance with the abovementioned CTI protocol, CSTA, and the CTI server 18 has a CTI interface 24 which operates in accordance with that protocol. There are a number of proprietary CTI protocols, e.g. Meridian Link from Nortel Networks, and several "open", or proposed standard, CTI protocols, including CSTA, but the performance of the present invention is not dependent upon the use of any particular CTI protocol.

The CTI system 10 also comprises a plurality of work desks, also known as workstations, 26R, situated remotely from the PBX 12, and a plurality of work desks 26L, situated locally to the PBX 12, each work desk having a respective telephone terminal 28R, 28L, referred to hereinafter as a telephone, and a respective computer terminal 30R, 30L, referred to hereinafter as a CTI client, or just client. For convenience, only one remote work desk 26R and only two local work desks 26L are shown.

The CTI server 18 and the local CTI clients 30L are directly connected to a LAN 32, and each remote CTI client 30R is indirectly connected to the LAN 32 via the ISDN 14 when a user at the respective remote work desk 26R makes a call to a predetermined destination number for access to the LAN 32. The PBX 12 receives that call and connects it to a corresponding port which is connected to the LAN 32 via an ISDN/LAN bridge 34. In a variant, the ISDN/LAN bridge 34 is connected directly to the ISDN 14.

In this description, the terms user and workgroup member are used interchangeably and synonymously.

Figure 2:
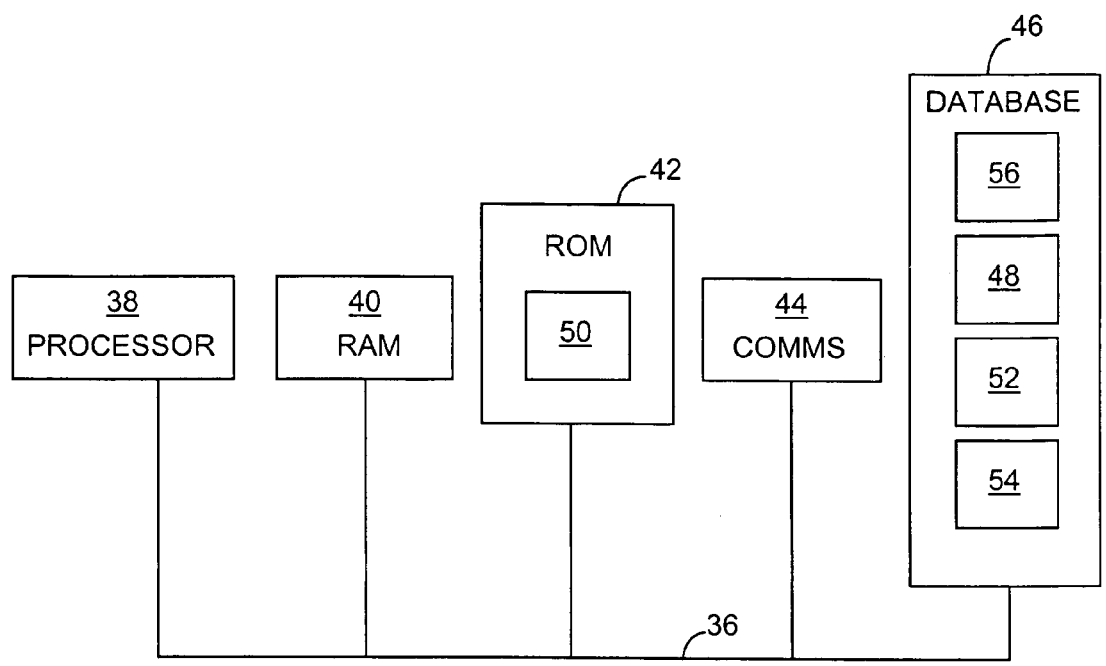
FIG. 2 shows the component parts of a CTI server of the apparatus of FIG. 1.

In FIG. 2, the CTI server 18 comprises an internal bus 36 to which is connected a processor 38, a RAM 40, a ROM 42, a data communications stack 44, and a database 46. The ROM 42 contains a conventional operating system program for controlling the processor 38, and a CTI program 50 for performing DOT functions including managing user profiles 52, and tables 54. The database 46 stores call logs 56, the user profiles 52, the tables 54, and user-associated stores 48.

Each user-associated store 48 comprises a workgroup substore 48W, and three substores 48-1, 48-2, 48-3, ranked in numerical order.

Figure 3:
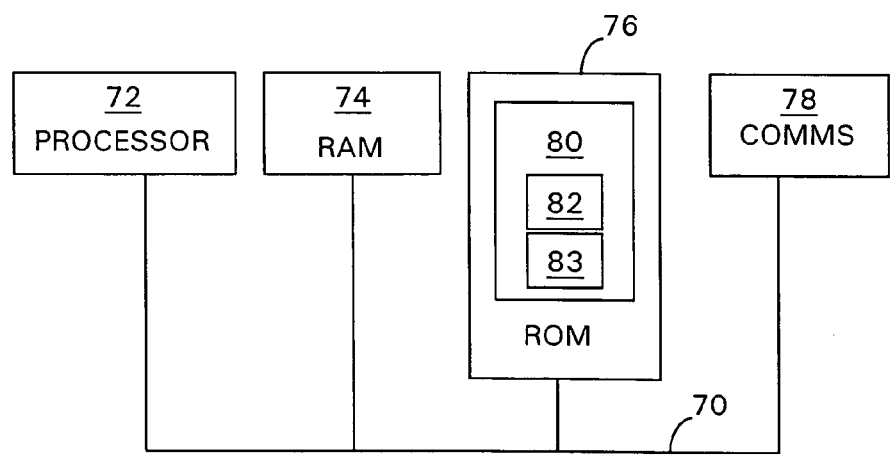
FIG. 3 shows the component parts of a CTI client of the apparatus of FIG. 1.

As shown in FIG. 3, the CTI client 30L comprises an internal bus 70 to which is connected a processor 72, a RAM 74, a ROM 76, and a data communications stack 78. The ROM 76 contains an operating system program for controlling the processor 72, and also contains a CTI program 80 for the operation of the CTI client 30L and including a Client Preview module 82 and a Client Countdown module 83.

Figure 4:
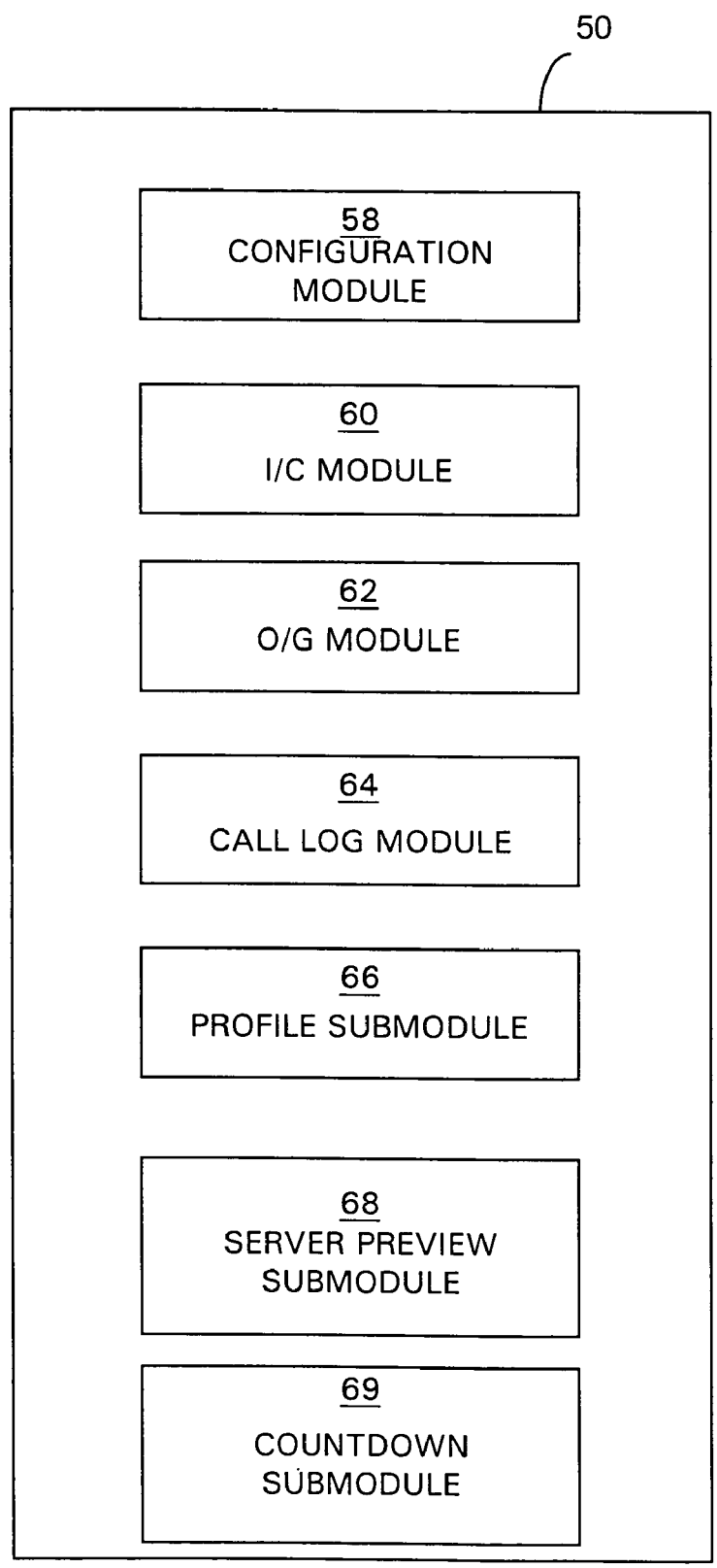
FIG. 4 shows the modules of a CTI program which controls the operation of the CTI server.

As shown in FIG. 4, the CTI program 50 comprises a number of main modules, namely: a Configuration module 58; an Incoming Call module 60, including a Server Preview submodule 68 and a Server Countdown submodule 69; an Outgoing Call module 62; a Call Log module 64; and a Profile submodule 66 for managing the user profiles 52.

Suppose that within the company owning the CTI system there is a department comprising ten users having usernames A to J. The respective workgroup substores 48W for those users all contain the usernames A to J, together with the respective user's assigned level of interest, also referred to as an importance rating, which the user will select from three levels, primary (1), secondary (2), and tertiary (3). The default assigned level for all usernames, other than the associated user's own username, in a workgroup substore 48W is tertiary, but the user can raise this to primary or secondary. The default assigned level for the associated user's own username is primary.

Suppose that user A has assigned levels as follows: usernames B to E (primary), usernames F and G (secondary) and usernames H to J (default). The other users will assign levels according to their particular interest in their respective colleagues' work.

When user A logs on, the CTI server 18 accesses his workgroup substore 48W, reads the usernames and their associated levels, and write A's username (username A) into the substores 48-1, 48-2, 48-3 as follows: username A in the respective substores 48-1 for users A to E, in the respective substores 48-2 for users F and G, and in the respective substores 48-3 for users H to J. When user A logs off, the CTI server 18 accesses all the substores 48-1, 48-2, 48-3 and deletes his username.

While a user is logged on to the CTI server 18, his computer displays a respective set of icons representing the members of that user's primary workgroup. When the user launches his DOT client application, the CTI controller accessed that user's workgroup substore 48W and instructed the display on that user's computer of icons corresponding to those usernames with assigned primary level. In other words, those usernames may be thought of as a list of "Users in whose calls I am (primarily) interested".

A user's substore 48-1 is referred to herein as containing the primary community of interest (COI) for his incoming calls, and may be thought of as a list of "Users (primarily) interested in my incoming calls", and mutatis mutandis for his other substores 48-2 and 48-3.

It will be thus appreciated that the default assigned level for a user's own username is primary so as to ensure that a called user is always a member of his own primary workgroup and his primary COI. In other words, that he always has his own icon displayed as a member of his workgroup, and that he is immediately alerted on receipt at the PBX 12 of a call for him.

When an incoming call is received at the PBX 12 for a called user who is logged on to the CTI server 18, i.e. has an active DOT client application, the CTI program 50 accesses that called user's substore 48-1, generates respective screen alerts for each of the members of that primary COI, sets a respective Alerted flag for that substore 48-1, and causes the called user's Client Countdown module 83 to start counting down from a countdown value stored in that user's profile. This will be a default value, unless the user has entered his preferred value.

The screen alert for the called user will be in the form of a screen pop containing the name of the caller, callername, (if this is recorded in translation tables 54 in the database 46) and any other details that the called user might have selected to be included.

The screen alert for the other members of that primary COI will be in the form of a change in the displayed icon representing the called user. The icon is in the form of a colour image of the user's face immediately above a text bar in which is indicated the user's telephony status. When the user is not logged on at a work desk 26, the CTI server 18 instructs the clients 30 of logged on members of that user's primary COI to display "Free" in the telephony status bar with grey fill, i.e. background colour. When the user has logged on at a work desk 26, the CTI server 18 instructs those clients 30 to display "Free" in the telephony status bar with green fill: and when, as in this case of an incoming call for the user, the CTI server 18 instructs those clients 30 to display the callername (or "Unknown") in the telephony status bar with red fill; and when the called user has answered the call, the CTI server 18 instructs each such client 30 to display "Busy" in the telephony status bar with yellow fill.

When a user sees a change in a displayed icon indicating that an incoming call has been received for the associated user, he can use his mouse to click on that icon. This activates his Client Preview module 82, which generates a screen pop displaying information about that call. This is referred to as previewing the call.

In a variant, instead of actual user-associated substores 48W, 48-1, 48-2 and 48-3, there is provided a logically equivalent arrangement wherein the CTI server 18 associates a respective session data store, referred to simply as a session, with a user when that user logs on to the CTI server 18. The session contains the network identity of the client at which the user logs on, the telephone number associated with that client, and the call data of each current call associated with that user. When a call is received for a user, the Server Preview submodule 68 checks the workgroup, in respective stores equivalent to substores 48W, of each user who has a current session, i.e. is logged on, and for each such workgroup that contains the username of the called user with an assigned level of 1 sends a Call Received message, described below, to the user associated with such workgroup. In a further variant, the CTI server 18 maintains a list of all users who are currently logged on, also referred to as being active, and this list is referred to as the active list. Thus references to messages being sent to those members of the workgroup who are currently active encompass any of the above methods, or equivalent methods, of ascertaining which of the members are currently logged on at a client. As an example of the use of an active list, if a call is received for, say, username B, then for each entry in the active list the respective workgroup is accessed to see whether it contains the username B with an assigned level of 1, and if so, then the user associated with that workgroup is sent a Call Received message in respect of the incoming call.

Figure 6A:
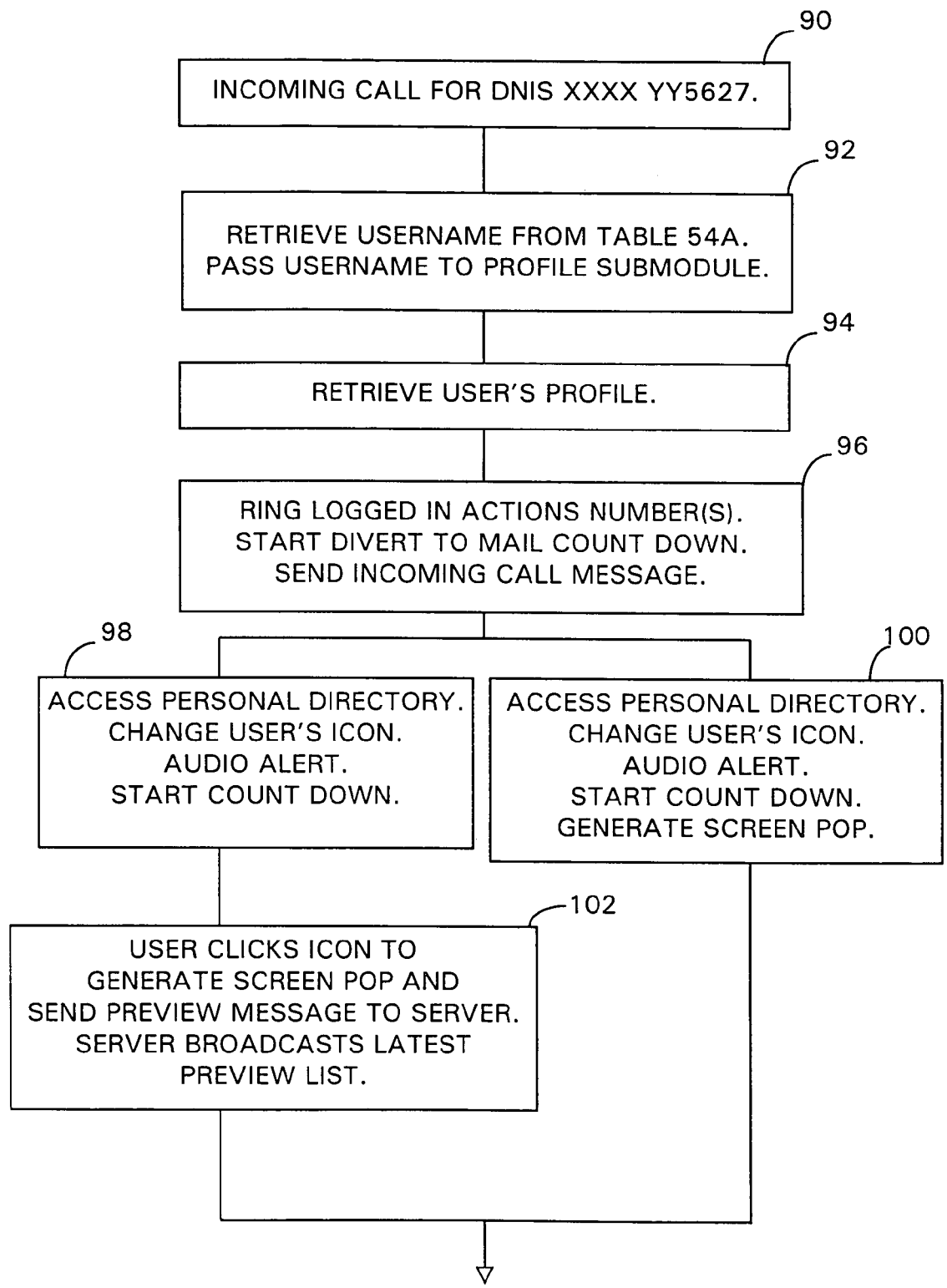
FIGS. 6A and 6B are a flow chart showing steps of a method of the present invention.

The steps of a preferred method of the present invention will now be described with reference to the flow chart of FIGS. 6A and 6B.

At step 90, the PBX 12 receives an incoming call from the ISDN 14, retrieves from the call signalling data a CLI, i.e. the telephone number of the calling terminal, constituting a caller identity of the present invention, and also a DNIS, i.e. the dialled telephone number, e.g. xxxxx yy5627 and constituting a called user identity of the present invention, allocates a unique call ID, and, as is known in the art, presents the call to an internal controlled directory number (CDN), corresponding to 5627, as a result of which the PBX 12 responds by passing all this data to the CTI server 18 in a Route Request message. In the art, such CDNs are also called routing points.

Figure 5:
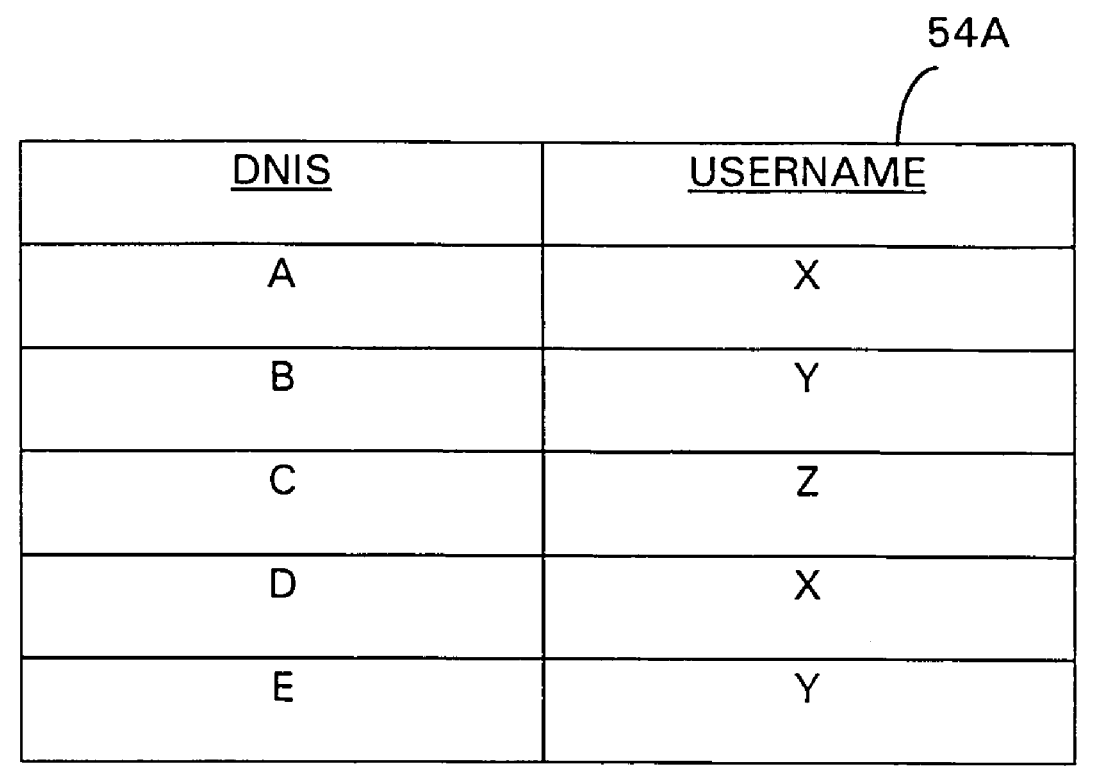

At step 92, the Incoming Call module 60 uses the received DNIS to access the DNIS-to-username translation table 54A (FIG. 5), retrieve a username associated with the received DNIS, and pass the username to the Profile submodule 66. Some users, e.g. those with usernames X and Y in FIG. 5, might be associated with two or more different DNISs, e.g. one for private calls, and another for business calls.

At step 94, the Profile submodule 66 uses the retrieved username to access the profiles 52 and retrieve a profile associated with the retrieved username. This profile contains the data on how that user wishes the CTI server 18 to handle the user's telephony events. A current status flag associated with Logged In Actions and Logged Out Actions sections determines which of these two is made available to the Server Preview submodule 68. In a variant, the CTI server 18 manages a list of logged in users, which the Profile submodule 66 consults to ascertain which of the two Actions sections is to be used.

At step 96, assuming that the user is logged in, the Server Preview submodule 68 refers to the user's Logged In Actions section of the retrieved profile and commands the PBX to make a respective internal call to the or each number listed, the calls being made simultaneously when there are two or more numbers listed; and the Countdown submodule 69 also refers to the user's Logged In Actions section of the retrieved profile, selects the highest ranking call-related feature that has an entry, e.g. Bob, and tries to match this with the caller identity, using the CLI-to-callername translation table 54B, and if there is a match, loads a countdown timer with the value in that call-related feature, i.e. 20, starts the countdown timer, and passes this value to the Server Preview submodule 68. If there is no match, the Countdown submodule 69 selects the next highest ranking call-related feature that has an entry, i.e. Upminster, and tries to match this with the area code of the CLI, using the area code-to-name translation table 54D, and so on.

In this example it will be assumed that the user has not selected Home or Mobile, and has not selected Divert To Mail. In other words, the list contains only the default number for This Desk. The Server Preview submodule 68, in known manner, instructs the PBX 12 to monitor and report telephony activity at the or each such PBX extension listed in the user's Logged In Actions. Accordingly, in this example, the PBX 12 reports that it has made a call, i.e. applied ringing current, to the PBX extension for the This Desk number, and reports the PBX-allocated call ID for that call. If the user has more than one number listed in his Logged In Actions, the PBX 12 reports the respective PBX-allocated call ID for each such call. The PBX also reports the allocated call ID when it makes a call to a remote network destination, e.g. a user's telephone 28R.

Also, at step 96, the Server Preview submodule 68 retrieves contents of the substore 48-1 associated with the retrieved username, i.e. all users recorded as having declared an interest, with an assigned level of 1, in the telephony status of the called user, and sends a Call Received message to each of the usernames retrieved from that substore 48-1, this message being sent to the clients where those users are currently recorded as being logged in. Hereinafter, with respect to a called user, these users are referred to as the substore 48-1 members. This Call Received message comprises an incoming call ID; the CLI; a corresponding callername, if there is an entry in the table 54, otherwise the text Unknown; the retrieved username; the Divert to Mail countdown timer start value; and any notes that the user has entered.

At step 98, at the clients of all the substore 48-1 members the respective Client Preview module 82 accesses the user's downloaded personal directory using the CLI received from the Server Preview submodule 68 and checks whether the user has entered a "familiar" or informal name for that CLI, i.e. a name other than a formal name held in the system-associated translation tables. Different substore 48-1 members might have different familiar names for a given caller. If the user has no entry in his personal directory for that CLI, the Client Preview module 82 changes the telephony status bar in the called user's icon from green fill with the text "Free" to red fill with either the received callername or "Unknown" to indicate that a new call has arrived for that user. However, if there is such an entry, the Client Preview module 82 retrieves the familiar name, changes the telephony status bar in the called user's icon to red fill with the retrieved familiar name. The Client Preview module 82 also generates an audio alert via a sound card of the client; and loads a countdown timer with the received start value and starts the timer.

At step 100, at the called user's client only, the Client Preview module 82 immediately passes the countdown timer start value to a Client Countdown module 83 which responds by allocating a respective called user-associated countdown timer, loading the start value, and starting the countdown operation. The Client Preview module 82 additionally generates a screen pop bearing the title "Incoming Call For:", followed by the called username. The screen pop displays information comprising current date and time, the CLI, the familiar name (if any), the notes, and the current countdown timer value, received from the Client Countdown module 83; and includes buttons for Answer, End Call, Send To Vmail, Apply and Dismiss, and an icon for Personal Directory. The operation of these buttons, other than those for Apply and Personal Directory, is self-evident and will not be described. The Apply button is used to send an Apply message to the CTI server 18 with any changes that the user has entered via the screen pop. For example, if neither the global directory in the CTI server 18 nor the user's personal directory yet contains an entry for the received CLI, the user can overwrite "Unknown" with a name and click on Apply. This creates an entry in the user's personal directory and sends an Apply message to the CTI server 18. Similarly, the user can update the notes and click on the Apply button. The Personal Directory button is conventional, except that when the user clicks on this button, the list of names of his personal directory appears in a window, with the entry corresponding the current CLI highlighted and thus ready for immediate selection, if there is such an entry. This facilitates situations where the user wishes to add the name and address details of a new caller by first typing the caller's name over "Unknown" and clicking on the Apply button, then clicking on the Personal Directory button, then clicking on a Select button in the personal directory window to gain access to an address part of the personal directory for the new entry. The user then types in the address details and clicks on the Apply button to effect the entry into his personal directory of the new text and to send a corresponding Apply message to the CTI server 18.

At step 102, any of the substore 48-1 members, other than the user himself, who already has the relevant screen pop on his screen, can click on the user's icon to preview the call. This activates the Client Preview module 82 to generate an Incoming Call screen pop to be displayed on that member's screen, using the information received from the Server Preview submodule 68, and to send a Preview Call message to the Server Preview submodule 68. The Server Preview submodule 68 upon receipt of a first Preview Call message for that call ID generates a respective Preview List for that call ID, adds that member's username to the Preview List, broadcasts the Preview List to all the substore 48-1 members, and passes the Preview List to the Call Log module 64 for storing. For subsequently received Preview Call messages for that call ID, the Server Preview submodule 68 adds the respective members' usernames to the existing Preview List.

The clients are arranged to display the received Preview List in the Incoming Call For screen pop. In this way, when a member previews the user's incoming call, the member can see who is calling, any notes that the user has entered in his profile for that caller, who else is previewing that call, and the time left before the call is sent to Voice Mail.

When a member closes their screen pop, in conventional manner by clicking on a Quit button or on the standard Windows "X" close icon, their Client Preview module 82 sends a Cease Preview message to the CTI server 18, where the Server Preview submodule 68 updates the Preview List by deleting that member's username from the Preview List, and sending the updated Preview List to all the substore 48-1 members.

The present invention is concerned with the operation of the DOT system in the event that not one of the called users' primary COI answers the call and the countdown timer reaches zero (FIG. 6B, step 104) resulting in the CTI server 18 commanding the PBX 12 to route the call to the VM 21 (FIG. 6B, step 106) by sending a Route Select message containing the call ID and the extension number to which the VM 21 is connected, i.e. 6000. The CTI server 18 also sends a Go To Idle message to each of the clients of the primary COI to cause the called user's icon to change back to its previous Free state. In variants, the message is a Change Icon message containing an icon identifier corresponding to the call having been routed to the VM 21.

In this embodiment, the operator console 27 is assigned the extension number 5678, and the VM 21 responds (FIG. 6B, step 108) to a call routed from the switch by playing an announcement which includes the words "Key zero to be connected to an operator, or key one to re-present this call". In a variant, the announcement includes the words "or leave a message". In a variant, the call routed from the switch includes in its signalling information the DNIS xxxxx yy5627. The VM 21 retrieves the DNIS from the received call and uses it to access a store of personalised announcements. These might be, for example announcements recorded by the users of the DOT system.

If the caller responds to the announcement by keying the digit zero on his telephone key pad, a dual tone multi frequency (DTMF) receiver 29 of the VM 21 detects the presence of the tones corresponding to the digit zero and provides a corresponding output. The VM 21 control program responds to that output by initiating a call to the PBX 12 via the second telephony link 25, i.e. presenting off-hook state to the corresponding port, and when the PBX 12 responds with dial tone, by sending telephony signalling for the pre-assigned extension number 7777. This number is also a CDN (route point), and the PBX 12 responds in normal manner by sending to the CTI server 18 a Route Request containing the requested number 7777. The CTI server 18 accesses its database and retrieves the stored extension number, say 5678, for the entry corresponding to 7777.

The CTI server 18 now sends a Routing message to the PBX 12 for completion of the call from the VM 21 to extension 5678. The VM 21 connects the voice channel of its incoming call to that outgoing call, i.e. trombones the call, to complete the voice connection for the caller through to the operator. In variants, the PBX 12 performs route optimisation, connecting the incoming call directly to extension 5678, and releasing the call to the VM 21, which responds by presenting on-hook state on the link 25.

If the caller responds to the announcement by keying the digit one (FIG. 6B, step 110), the DTMF receiver 29 provides a corresponding output, the VM 21 control program responds to that output by initiating a call to the PBX 12, and when the PBX 12 responds with dial tone, sending telephony signalling for the pre-assigned extension number 8888 (FIG. 6B, step 112), constituting a predetermined called user identity of the present invention, and including the call ID of that call routed from the PBX 12. The number 8888 is also a CDN, and the PBX 12 responds by sending to the CTI server 18 a Route Request containing the requested number 8888. The CTI server 18 recognises from the call ID that this call from the VM 21 is a re-presented call in respect of the original call to 5627, and accesses its database again for the entry corresponding to 5627.

The CTI server 18 checks the state of the Alerted flag for the substore 48-1, finds that it is set, steps on to check the state of the Alerted flag for the substore 48-2, and, upon finding that it is not set, proceeds to generate respective screen alerts (FIG. 6B, step 114) for each of the members of the primary COI (substore 48-1) and the secondary COI, i.e. the substore 48-2, and to set a respective Alerted flag for the secondary COI (substore 48-2). The called user's Client Countdown module 83 is again triggered to start counting down from the countdown value.

The generated screen alerts in this case display the text "Re-presented", or some other suitable text, so that the alerted user will immediately know that the caller has requested the call to be re-presented instead of leaving a message in the VM 21.

In the event that no one of the called users' primary and secondary COIs answers the re-presented call and the countdown timer reaches zero (FIG. 6B, step 116), the CTI server 18 responds by first releasing the original incoming call from the VM 21, and then (FIG. 6B, step 118), in the same way as before, (i.e. repeating steps 106 to 112) routing the call again to the VM 21, and this time sending a Go To Idle message to each of the clients of both the primary and the secondary COIs to cause the called user's icon to change back to its previous Free state.

If the caller responds to the VM 21 announcement by again keying the digit zero on his telephone key pad, the VM 21 will again send telephony signalling for the pre-assigned extension number 8888 and including the call ID of that call routed from the PBX 12. The PBX 12 will again respond in normal manner by sending to the CTI server 18 a Route Request containing the requested number 8888. The CTI server 18 recognises from the call ID that this call from the VM 21 is a re-presented call in respect of the original call to 5627, and accesses its database again for the entry corresponding to 5627.

The CTI server 18 checks the state of the Alerted flag for the substore 48-1, finds that it is set, steps on to check the state of the Alerted flag for the substore 48-2, finds that it is set, steps on to check the state of the Alerted flag for the substore 48-3, and, upon finding that it is not set, proceeds to generate respective "Re-presented" screen alerts (FIG. 6B, step 120) for each of the members of the primary COI (substore 48-1), the secondary COI (the substore 48-2), and the tertiary COI, i.e. the substore 48-3, and to set a respective Alerted flag for the tertiary COI (substore 48-3). The called user's Client Countdown module 83 is again triggered to start counting down from the countdown value.

Figure 6B:
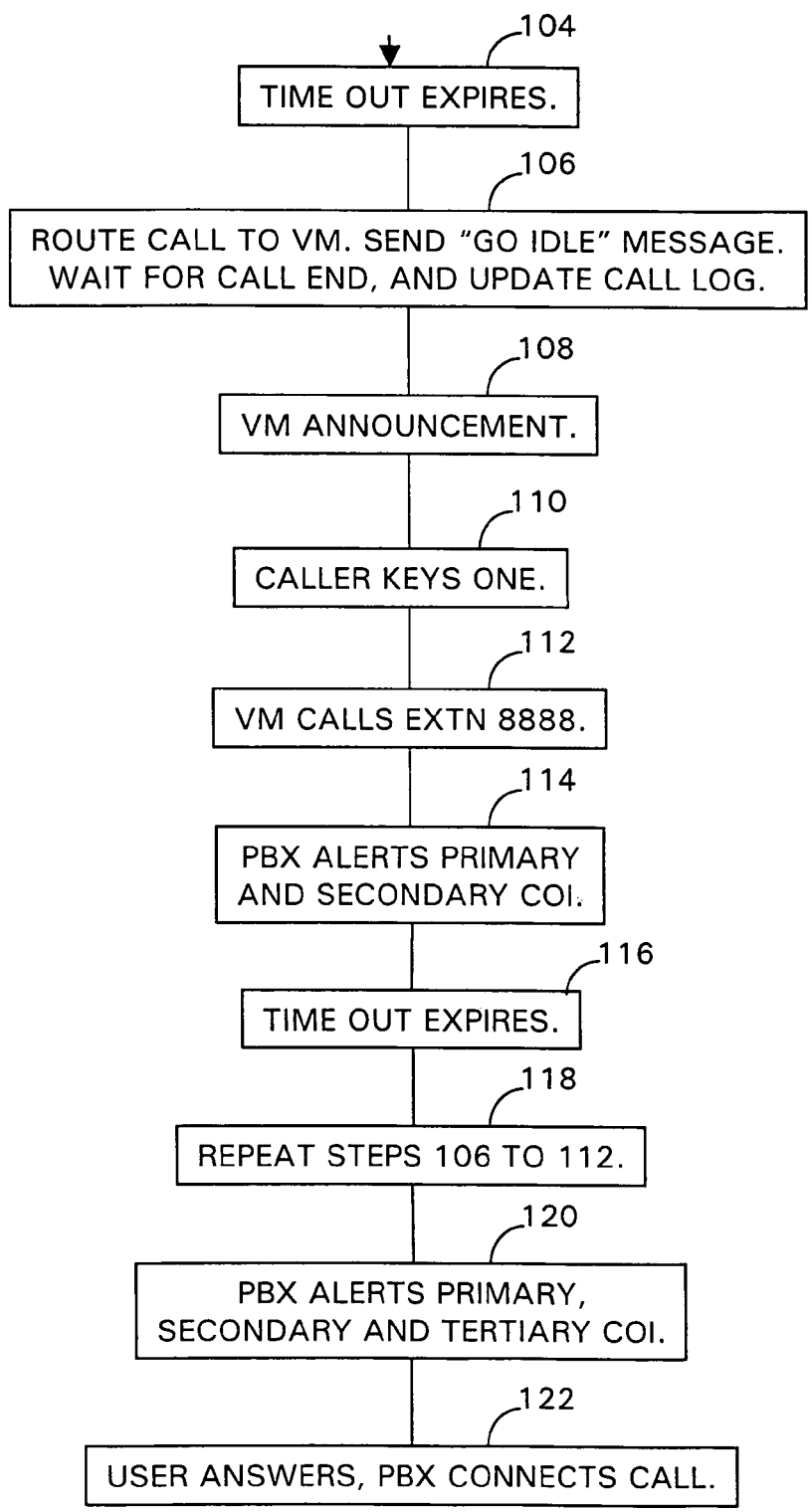

If a user answers a re-presented call, the CTI server 18 sends a Routing message to the PBX 12 for completion of the call from the VM 21 to the extension of the answering user (FIG. 6B, step 122). The VM 21 connects the voice channel of its incoming call to its outgoing call, i.e. trombones the call, to complete the voice connection for the caller through to the answering user. Again, in variants, the PBX 12 performs route optimisation, connecting the incoming call directly to the answering user, and releasing the call to the VM 21.

In the event that no one of the called users' primary, secondary and tertiary COIs answers the re-presented call and the countdown timer reaches zero, the CTI server 18 responds by first releasing the original incoming call from the VM 21, and then connecting the caller to an announcement facility for the delivery of a "Your re-presented call cannot be answered at this time. Please try again later". In a variant, the CTI server 18 responds by first releasing the original incoming call from the VM 21, routing the call again to the VM 21, and sending respective Go To Idle messages. However, in this variant, the CTI server 18 sends a command to the VM 21 to play a different announcement which omits the words "or key one to re-present this call". In this way, the user knows that the DOT system has re-presented the call to the widest COI but that no one has answered, and the user now has the choice of leaving a message with the VM 21 or keying zero to be connected to the operator.

Whereas in the specific embodiments described above the call was re-presented to successively larger COIs, each of which included the called user's primary COI, in variants, the first re-presenting is to a COI which does not include the called user's primary COI, e.g. just the called user's secondary COI, and similarly the second re-presenting is to the called user's tertiary COI. This enables users to choose which re-presenting to receive a screen alert for, e.g. user A can assign both primary and tertiary levels to user B, so that when user A logs on, his username A is written into user B's substores, 48-1 and 48-3. Thus, user A's client does not generate a "Represented" screen alert upon the first re-presenting of a call to user B, but it will generate a "Re-presented" screen alert upon the second re-presenting of that call.

In variants, the VM 21 responds to the caller leaving a message by sending a signal to the CTI server 18, which responds by sending a corresponding Change Icon message to the clients for indicating that the caller is leaving a message on the VM 21. The data for displaying the whole range of icons is stored in the clients and the Change Icon message contains an icon identifier which commands the clients which icon is to be displayed next.

In the specific embodiments described above, the CTI server 18 constitutes means for storing, for each user of the system, a respective first user-associated list of users who have assigned a first level of interest in the telephony status of that user, herein referred to as that user's first community of interest, and a respective second user-associated list of users who have assigned a second level of interest in the telephony status of that user, herein referred to as that user's second community of interest; the PBX 12 and the CTI server 18 together constitute means for responding to receipt at the switch of an incoming call, referred to herein as an original incoming call, by retrieving from signalling data of that original incoming call a called user identity, referred to herein as the original called user identity, and by starting a countdown timer from a predetermined value; the CTI server 18 itself constitutes means for sending an incoming call message from the CTI controller to the respective computers of those members of that original called user's first community of interest who are currently logged on to the CTI controller; the CTI program 80 constitutes means for responding to receipt of the incoming call message at those respective computers by generating an alert; the CTI server 18 and the PBX 12 together constitute means responsive to the countdown timer reaching zero for routing that original incoming call to the voice messaging apparatus and for sending a go to idle message to those respective computers to cease the respective generated alerts; the VM 21 (including its DTMF receiver 29) together with the CTI server 18 and the PBX 12 constitutes means for responding to receipt at the voice messaging apparatus of that routed original incoming call and of predetermined dialled data from the caller by making a related call from the voice messaging apparatus to a predetermined called user identity of the switch; the CTI server 18 constitutes means for recognising that a call received at the switch is such a related call by virtue of the presence of that predetermined called user identity in the signalling data of that received call; the CTI server 18 constitutes means for identifying the original incoming call to which that received call is so related, and, therefore, the original called user identity; and the CTI server 18 constitutes means for sending an incoming call message from the CTI controller to the respective computers of those members of that called user's secondary community of interest who are currently logged on to the CTI controller.

Whereas the specific embodiments described above are based on a switch in the form of a PBX, it will be appreciated that the present invention embraces other forms of switching function. For example, the switch can be a public network switch, such as a Nortel DMS100 switch which is used in known CTI arrangements in conjunction with a CompuCall CTI controller; and other forms of switching function include switches known as Automatic Call Distributor (ACD), Interactive Voice Response (IVR), and server PBX. Furthermore, the type of switching is not limited to any one form, and, in addition to switched circuit technology, includes Asynchronous Transfer Mode (ATM) switching, and Voice over Internet Protocol (VoIP) switching. With regard to this last form of switching, the switch can be a PBX having an Internet Card, or it can be a general purpose computer, e.g. one running Windows NT, having an Internet card, e.g. a Dialogic Internet card, and in this latter case the CTI controller function is provided by a program running in the computer, rather than in a separate controller. Furthermore, the telephones at the workstations can connect to their respective clients via Internet phone jacks, and in an alternative arrangement telephony can be provided for the user via a sound card in his client.

Thus, it can be seen that in general the present invention can be implemented in any computer controlled switch, by means of a suitable controlling program.

In the above specific embodiments, the called user is an individual person who normally works at a workstation. It will be appreciated that a DNIS need not correspond to an individual person, but may relate to a department or group, or a specific function within a company. Furthermore, more than one DNIS can correspond to such a function.

Similarly, the present invention includes caller identities other than the abovementioned CLI. These include a cell identity when the caller is using a mobile telephone, an alphanumeric string, an Internet Protocol address, and "null" information, e.g. where a caller has withheld his CLI.

It will also be appreciated that the term CTI, although originating from the computer control of voice telephony, is not limited to voice communications and includes other types of communications, e.g. videotelephony, and multimedia.

Furthermore, whereas the above described specific embodiments are third party CTI arrangements, the skilled person will appreciate that the present invention is also applicable to first party CTI arrangements.

In the above description, the incoming call was described as being handled by the called user's DOT client application. In a variant, the incoming call might be connected directly to the VM 21, without the called user's primary COI being alerted to that incoming call, for example the called user might have set "Divert to Voicemail".

In another variant, the called user might not be a DOT user and have set "Divert to Voicemail", and the VM 21 responds to a key press of "one" from the caller in the same way as above. The CTI server 18 recognises that the call prima facie seems to be a re-presented call, but that it has no existing record in respect of the call ID, and uses a predetermined COI specifically for such non-DOT user calls reverted from the VM 21.

In the above embodiments and variants, the CTI server 18 checks whether it has already handled a call by comparing call IDs. Other methods may be used for this purpose, for example the VM 21 can preserve the DNIS (xxxxx yy5627) that it receives in the original call from the PBX 12, and include that DNIS in the represented call to the extension 8888.

Unless the context clearly requires otherwise, throughout the description and the claims, the words "comprise", "comprising" and the like are to be construed in an inclusive as opposed to an exclusive or exhaustive sense; that is to say, in the sense of "including, but not limited to".

What is claimed is:

1. A method of operating a computer telephony integration (CTI) system comprising a switch and a CTI controller therefor, voice messaging apparatus connected to the switch, and a plurality of user workstations, each workstation comprising a computer connected to the CTI controller and a telephone connected to the switch, the method comprising:

storing, for each user of the system, a respective first user-associated list of users who have assigned a first level of interest in the telephony status of that user, herein referred to as that user's first community of interest, and a respective second user-associated list of users who have assigned a second level of interest in the telephony status of that user, herein referred to as that user's second community of interest;

responding to receipt at the switch of an incoming call, referred to herein as an original incoming call, by retrieving from signalling data of that original incoming call a called user identity, referred to herein as the original called user identity, and by starting a timer from a first predetermined value;

sending an incoming call message from the CTI controller to the respective computers of those members of that original called user's first community of interest who are currently logged on to the CTI controller;

responding to receipt of the incoming call message at those respective computers by generating an alert;

in the event that the timer reaches a second predetermined value, routing that original incoming call to the voice messaging apparatus and sending a change icon message to those respective computers to change the respective generated alerts;

responding to receipt at the voice messaging apparatus of that routed original incoming call and of predetermined dialled data from the caller by making a related call from the voice messaging apparatus to a predetermined called user identity of the switch;

recognizing that a call received at the switch is such a related call by virtue of the presence of that predetermined called user identity in the signalling data of that received call;

identifying the original incoming call to which that received call is so related, and, therefore, the original called user identity; and sending an incoming call message from the CTI controller to the respective computers of those members of that called user's secondary community of interest who are currently logged on to the CTI controller.

2. A method as in claim 1, wherein, when the incoming call message is sent to the respective computers of those members of that called user's secondary community of interest who are currently logged on to the CTI controller, it is also sent to the respective computers of those members of that called user's primary community of interest who are currently logged on to the CTI controller.

3. A method as in claim 1, wherein the step of generating an alert comprises changing a user-associated icon from an idle state to an incoming call state; and the respective computers respond to said change icon message to change the respective user-associated icons back to their idle state.

4. A method as in claim 1, wherein the step of generating an alert comprises changing a user-associated icon from an idle state to an incoming call state; and the respective computers respond to said change icon message to indicate that the original incoming call has been routed to the voice messaging apparatus.

5. A method as in claim 1, wherein the identifying step comprises comparing call identities of the respective calls.

6. A method as in claim 1, wherein the identifying step comprises comparing DNIS numbers of the respective calls.

7. A computer telephony integration (CTI) system comprising a switch and a CTI controller therefor, voice messaging apparatus connected to the switch, and a plurality of user workstations, each workstation comprising a computer connected to the CTI controller and a telephone connected to the switch, the system comprising:

means for storing, for each user of the system, a respective first user-associated list of users who have assigned a first level of interest in the telephony status of that user, herein referred to as that user's first community of interest, and a respective second user-associated list of users who have assigned a second level of interest in the telephony status of that user, herein referred to as that user's second community of interest;

means for responding to receipt at the switch of an incoming call, referred to herein as an original incoming call, by retrieving from signalling data of that original incoming call a called user identity, referred to herein as the original called user identity, and by starting timer from a first predetermined value;

means for sending an incoming call message from the CTI controller to the respective computers of those members of that original called user's first community of interest who are currently logged on to the CTI controller;

means for responding to receipt of the incoming call message at those respective computers by generating an alert;

means responsive to the timer reaching second predetermined value for routing that original incoming call to the voice messaging apparatus and for sending a change icon message to those respective computers to change the respective generated alerts;

means for responding to receipt at the voice messaging apparatus of that routed original incoming call and of predetermined dialled data from the caller by making a related call from the voice messaging apparatus to a predetermined called user identity of the switch;

means for recognizing that a call received at the switch is such a related call by virtue of the presence of that predetermined called user identity in the signalling data of that received call;

means for identifying the original incoming call to which that received call is so related, and, therefore, the original called user identity; and means for sending an incoming call message from the CTI controller to the respective computers of those members of that called user's secondary community of interest who are currently logged on to the CTI controller.

8. A CTI system as in claim 7, wherein, when the incoming call message is sent to the respective computers of those members of that called user's secondary community of interest who are currently logged on to the CTI controller, it is also sent to the respective computers of those members of that called user's primary community of interest who are currently logged on to the CTI controller.

9. A CTI system as in claim 7, arranged such that the generated alert comprises changing a user-associated icon from an idle state to an incoming call state, and wherein the respective computers are arranged to respond to the change icon message by changing the respective user-associated icons back to their idle state.

10. A CTI system as in claim 7, wherein the step of generating an alert comprises changing a user-associated icon from an idle state to an incoming call state; and the respective computers respond to the change icon message to indicate that the original incoming call has been routed to the voice messaging apparatus.

11. A CTI system as in claim 7, wherein the identifying means is arranged to compare call identities of the respective calls.

12. A CTI system as in claim 7, wherein the identifying means is arranged to compare DNIS numbers of the respective calls.

* * * * *